Nov. 2, 1954　　　O. H. SCHMITT　　　2,693,590
DUAL AMPLIFICATION SYSTEM
Filed Aug. 7, 1944　　　2 Sheets-Sheet 1
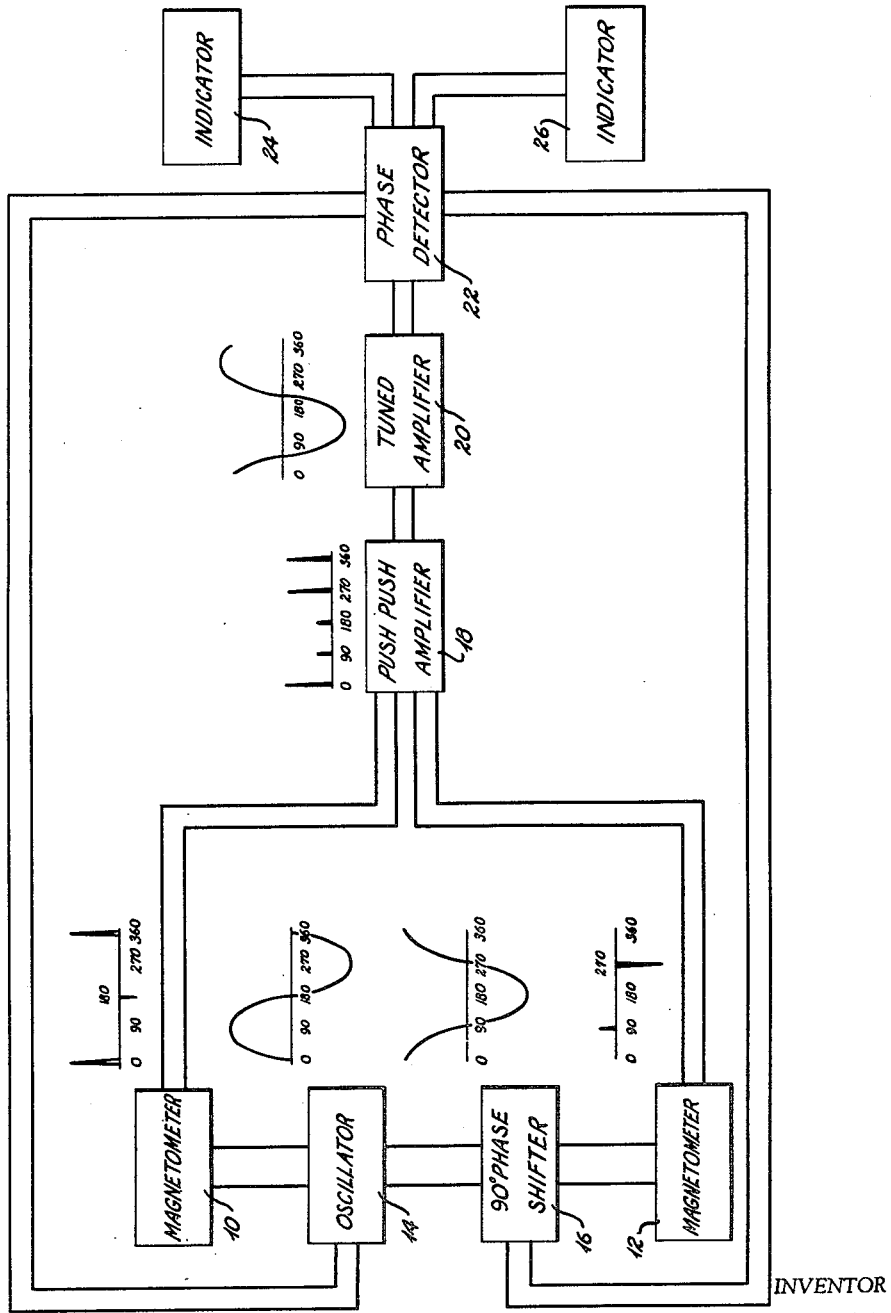
INVENTOR
Otto H. Schmitt
BY
ATTORNEYS Nov. 2, 1954     O. H. SCHMITT     2,693,590
DUAL AMPLIFICATION SYSTEM
Filed Aug. 7, 1944     2 Sheets-Sheet 2
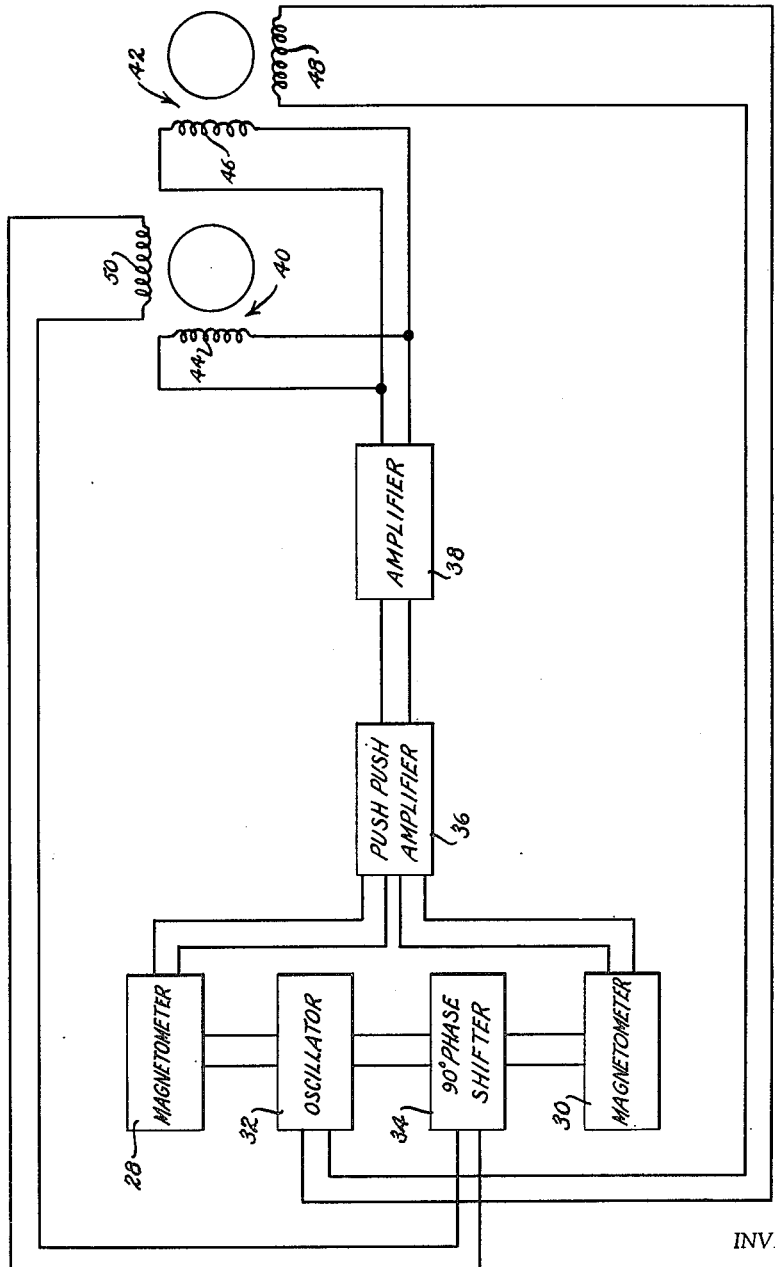
INVENTOR
Otto H. Schmitt
BY
ATTORNEYS

2,693,590

DUAL AMPLIFICATION SYSTEM

Otto H. Schmitt, Port Washington, N. Y., assignor to the United States of America as represented by the Secretary of the Navy Application August 7, 1944, Serial No. 548,491

1 Claim. (Cl. 340—197)

This invention relates to dual amplification systems, and more particularly to dual systems for amplifying two signals of the same frequency equally and simultaneously.

In many cases it is necessary to amplify two input signals simultaneously without changing their relative amplitudes or introducing unequal phase shifts in them. This is particularly true in those cases in which two or more complete measuring systems must be used to give certain required information, as for example when the ratio of the two signals must be compared accurately.

Thus for example in magnetic stabilization systems of the general type disclosed in copending application Serial No. 529,003, filed March 31, 1944, Magnetic Stabilization System, Donald G. C. Hare, separate magnetometers, each including an amplifier, are utilized as control means for motors arranged to produce stabilizing motions of a plane about two axes. In another application, paired magnetometer systems are arranged with their respective sensitive magnetometer elements in spaced relation, as for example on the opposite wing tips of an aircraft, and their outputs are utilized to produce indications of the lateral position of the aircraft in respect to a magnetic object, this system being substantially that disclosed in copending application Serial No. 531,422, filed April 17, 1944, Directional Indicator System, Victor V. Vacquier and John N. Adkins.

Previously, the provision of two complete magnetometer systems, as required in the devices mentioned above, resulted in the duplication of amplification equipment with attendant increases in weight and power consumption. In addition, and particularly when the two magnetometer systems were used in a directional indicator as in the second application mentioned above, it was necessary to provide matched systems having equal outputs for the same applied magnetic field. This required careful matching of the associated amplifier circuits as to amplification and frequency-discriminative characteristics.

It is an object of the present invention, therefore, to provide a light-weight dual amplification system which incorporates means insuring the production of equal outputs for equal input signals.

There is provided in accordance with the present invention, therefore, a system for amplifying two signals of the same carrier frequency simultaneously including means for shifting the phase of one of the signals until the two are in phase quadrature, means for combining the two signals to provide an output signal containing components proportional to each of the input signals, an amplifier for amplifying the output of the signal-combining means, and means for separating the components of the output of the amplifier to obtain individual output signals proportional to the two input signals.

The dual amplification systems of the invention is described hereinafter in its application to dual magnetometer systems of the type referred to above, but it will be understood that it is of general application in cases in which it is desired to amplify two signals of the same frequency equally and simultaneously.

For a better understanding of the invention, reference is made to the accompanying drawings, in which:

Fig. 1 shows a dual amplification system according to the invention as applied to a dual magnetometer system and illustrates the output-signal wave forms for various stages of the system; and Fig. 2 shows a modification of the system of Fig. 1, particularly adapted for use in magnetic stabilization systems.

Referring to Fig. 1, the dual amplification system is incorporated in a magnetometer system including separate sets of magnetometer elements 10 and 12, each of which includes a pair of saturated-core elements connected in a bridge arrangement and operated as an unbalanced magnetometer. The individual magnetometer-element sets are mounted in spaced relationship, the particular arrangement used being determined by the application to be made of the dual system.

The individual magnetometer-element sets are driven at the same frequency by means of an oscillator 14 and produce individual output signals proportional to the magnetic fields acting at their individual locations. Means are provided to shift the phase of the output signal of one of the magnetometer-element sets in respect to that of the other set until the two signals are in phase quadrature. Conveniently, this is accomplished by driving the element sets in quadrature, the required excitation in the case of magnetometer-element set 10 being obtained directly from oscillator 14, while that for magnetometer-element set 12 is obtained from the same oscillator, the excitation in this case, however, being rendered in phase quadrature by a 90-degree phase shifter 16.

The output signals of the individual magnetometer-element sets, as shown in Fig. 1, each comprise a series of pulses occurring at twice the drive frequency and alternating in polarity. The amplitudes of these pulses vary with applied magnetic field, the positive pulses become more positive and the negative pulses become less negative for one polarity of field and vice versa for an applied field of the other polarity.

The output signals from the individual magnetometer-element sets are applied to separate input circuits of a signal-combining circuit, as for example a push-push amplifier 18, by means of which the separate magnetometer input signals from the element sets are combined to produce an output signal, see Fig. 1, comprising a series of unipolar pulses having a pulse frequency equal to four times the drive frequency, the amplitudes of alternate pulses in this signal being controlled respectively by the input signals from the individual magnetometer-element sets.

Considering the operation of the portion of the system just described, it will be understood that when there is no magnetic field acting at the location of either of the magnetometer-element sets, the input signals from the magnetometer-element sets are equal and the pulses comprising the output signal of push-push amplifier 18 are all of the same height. The application of magnetic field at only one of the magnetometer-element sets results in variations in the amplitudes of the odd pulses, the even pulses corresponding to the output of the other magnetometer-element set remaining constant in amplitude. When there are magnetic fields acting at each of the magnetometer-element sets, all of the pulses are of course affected, but the amplitudes of the odd and even pulses vary independently in accordance with the individual output signals from the two magnetometer-element sets.

The output of amplifier 18 is applied to an amplifier, in this case frequency-selective amplifier 20 which is tuned to the frequency of the drive excitation produced by oscillator 14. When there are no magnetic fields acting at the locations of the individual magnetometer-element sets, there is no selective-amplifier output, since the pulses at the output of push-push amplifier 18 are all of the same amplitude and the pulse frequency is equal to four times the drive frequency. On the other hand, application of magnetic fields to either of the magnetometer-element sets results in the appearance in the output of amplifier 18 of a set of pulses, variations in the envelope of which occur at fundamental frequency. Under this condition, amplifier 20 has a sinusoidal output, see Fig. 1, corresponding in amplitude to variations in the output signal of one of the magnetometer-element sets. If there are magnetic fields acting on both of the magnetometer-element sets, both sets of pulses in the output signal from push-push amplifier 18 are varied, resulting in the production in amplifier 20 of two output components in phase quadrature and varying independently in amplitude with the output signals from the two magnetometer-element sets.

It will be recognized that the two magnetometer-element sets are driven by the same oscillator and that the input signals from the two sets are combined and amplified in common circuits. Thus the two signals are amplified equally and any phase shifts or time lags appear in equal amounts in the two components at the output of amplifier 20.

Since the output of amplifier 20 contains components individually proportional to the input signals from the two sets of magnetometer elements, it may be used, depending upon the way in which the elements are mounted, to operate separate means for indicating the magnetic field intensities at the locations of the individual magnetometer-element sets, for operating a directional indicator, or for operating the two motors of a stabilization system. In each case, means must be provided for separating the two signal components so that they may be applied individuallly to the required output devices.

When the dual system is used to operate a pair of indicators or a single directional indicator, the signal components are separated by suitable discriminating circuits. Accordingly, the output of amplifier 20 is applied to a phase discriminator 22 by means of which the two components in the output of amplifier 20 may be separated and utilized to produce separate voltages proportional to the individual components. Phase discriminator 22 may conveniently be of the type in which the input signal is compared simultaneously with in-phase and quadrature reference signals to obtain a measure of the amplitudes of the separate components contained therein. The separate outputs of phase discriminator 22 may be applied to individual indicators 24 and 26, each of which therefore provides an indication of variations in the magnetic field acting at one of the magnetometer-element sets, or they may be utilized as input signals for a directional indicator or similar system.

As pointed out above, the output of amplifier 20 may be used to operate two motors in such manner that they are individually controlled by the magnetic fields acting at the separate sets of the magnetometer elements, this arrangement being suited for use in light-weight magnetic stabilization systems. A system for this purpose is shown in Fig. 2 and includes many of the circuit components previously described which have the same output-signal wave forms as those shown in Fig. 1. Accordingly, there are provided two sets of magnetometer elements 28 and 30 of the same general type as magnetometer-element sets 10 and 12 of Fig. 1. These elements are driven in quadrature by oscillator 32, the output of which is applied directly to the magnetometer elements in the case of magnetometer-element set 28, and through 90-degree phase shifter 34 to the magnetometer elements in the case of magnetometer-element set 30. The outputs of the two magnetometer-element sets are applied to a push-push amplifier 36 and a selective amplifier 38, these units being identical respectively with demodulator 18 and amplifier 20, described above in connection with Fig. 1.

The output of amplifier 38, therefore, may contain sinusoidal components proportional respectively to the inputs from the individual magnetometer-element sets and in phase quadrature. This signal is utilized to control two two-phase motors 40 and 42. For this purpose, the amplifier output is applied to winding 44 of motor 40 and winding 46 of motor 42 in parallel, the remaining windings of these motors being excited constantly by suitable signals obtained directly or indirectly from oscillator 32. Thus winding 48 of motor 42 is excited directly from oscillator 32, while winding 50 of motor 40 is excited from the output of 90-degree phase shifter 34. Since rotations of two-phase motors of this type depend primarily upon the fractions of the exciting signals to the two fields thereof which are in quadrature, it will be understood that the motors automatically discriminate between the two components in the output of amplifier 38, motor 42 responding only when the output of amplifier 38 contains a component in quadrature with the oscillator output, and motor 40 responding only when the output of amplifier 38 contains a component in phase with the oscillator output. Thus it will be understood that rotation of motor 40 is controlled both in direction and speed by magnetometer-element set 28, while that of motor 42 is controlled by magnetometer-element set 30.

While the dual amplification system of the invention has been described in its application to dual magnetometer systems, it will be recognized that it may be used in many other applications if suitable input signal-combining circuits and output-discriminating devices are chosen for the specific application to be made of the system. It is also pointed out that, while a selective amplifier is contemplated in the application of the dual amplification system to magnetometer systems, a simple non-selective amplifier may be used in many cases.

What is claimed is:

A magnetometer system comprising a driving means producing two driving signals of the same frequency and in phase quadrature; a pair of spaced magnetometers each driven by one of said signals, said magnetometers each producing a series of pulses of alternate polarity occurring at twice the driving frequency with the amplitudes of alternate pulses varying oppositely in response to an applied magnetic field; means coupled to the output of said magnetometers for combining the two series of pulses into a single series of pulses the amplitude of the envelope of which varies in proportion to the applied magnetic field and has a frequency equal to the driving frequency, said means comprising means for simultaneously inverting the alternate pulses of each of said series and for combining the pulses of both series into a single series of unipolar pulses having a pulse-repetition frequency of four times the driving frequency; amplifying means tuned to the driving frequency and coupled to the output of the inverting and combining means for amplifying and passing the single series of pulses only when the envelope thereof is at the driving frequency; and discriminator means coupled to the amplifying means and to the driving means for comparing the amplified single series of pulses with the driving signals to separate said amplified single series of pulses into signals proportional to said series of pulses.

References Cited in the file of this patent

UNITED STATES PATENTS

| Number | Name | Date |
| --- | --- | --- |
| 2,234,331 | Bond | Mar. 11, 1941 |
| 2,238,129 | Paul | Apr. 15, 1941 |
| 2,274,546 | Hugenholtz | Feb. 24, 1942 |